United States Patent [19]
Nakafutami et al.

[11] Patent Number: 5,804,644
[45] Date of Patent: Sep. 8, 1998

[54] HYDROGENERATED RUBBER COMPOSITION

[75] Inventors: Yasunobu Nakafutami, Kawasaki; Akira Saito, Fujisawa; Tsuyoshi Sugiyama, Kawasaki, all of Japan

[73] Assignee: Asahi Kasei Kabushiki Kaisha, Osaka, Japan

[21] Appl. No.: 765,800

[22] PCT Filed: Jul. 26, 1995

[86] PCT No.: PCT/JP95/01482

§ 371 Date: Jan. 15, 1997

§ 102(e) Date: Jan. 15, 1997

[87] PCT Pub. No.: WO96/05250

PCT Pub. Date: Feb. 22, 1996

[30] Foreign Application Priority Data

Aug. 8, 1994 [JP] Japan .................................. 6-204182

[51] Int. Cl.⁶ ................................ C08K 3/36; C08L 9/00
[52] U.S. Cl. ........................ 524/572; 524/492; 524/493; 525/332.6; 525/332.7; 525/332.8; 525/332.9; 525/33.1; 525/333.2; 525/338; 523/213; 152/209 R; 152/450
[58] Field of Search ...................... 524/492, 493, 524/572; 523/213; 525/332.6, 332.7, 332.8, 332.9, 333.1, 333.2, 338; 152/209 R, 450

[56] References Cited

U.S. PATENT DOCUMENTS

| | | |
|---|---|---|
| 3,756,977 | 9/1973 | Yoshimoto et al. ................. 524/572 |
| 5,017,660 | 5/1991 | Hattori et al. . |
| 5,227,425 | 7/1993 | Rauline . |
| 5,409,969 | 4/1995 | Hamada . |
| 5,610,216 | 3/1997 | Sandstrom et al. ............. 524/493 X |
| 5,614,580 | 3/1997 | Zanzig et al. ..................... 524/493 X |

FOREIGN PATENT DOCUMENTS

| | | |
|---|---|---|
| 62-50346 | 3/1987 | Japan . |
| 62-227908 | 10/1987 | Japan . |
| 3-239737 | 10/1991 | Japan . |

OTHER PUBLICATIONS

Hackh's Chem Dictionary (4th ed) McGraw–Hill, N.Y., 633 (1969).

*Primary Examiner*—Fred Teskin
*Attorney, Agent, or Firm*—Birch, Stewart, Kolasch & Birch, LLP

[57] ABSTRACT

A rubber composition comprising (A) 100 parts by weight of a raw material rubber which contains not less than 30% by weight of at least one partially hydrogenated rubber of a conjugated diene rubber, wherein 5 to 70% of the unsaturated double bonds of the conjugated diene portion thereof have been hydrogenated;

(B) 10 to 150 parts by weight of a silica;

(C) 0.1 to 20 parts by weight of an organo-silane coupling agent; and (D) 0.1 to 10 parts by weight of a vulcanizing agent. The rubber composition of the present invention has extremely excellent resilience, low exothermic property, and excellent wet skid resistance, and further improved processability, and therefore, by utilizing the characteristics, can be used to make industrial parts such as tires for various types of automobiles, rubber vibration insulators, belts, and the like. Especially when it is used for a tire, it can be suitably used for a tread portion, a cap tread portion, and an undertread portion of a tire, for instance, and exhibits the effect of saving fuel cost by improving fuel efficiency of a vehicle which utilizes the tire.

25 Claims, No Drawings

HYDROGENERATED RUBBER COMPOSITION

TECHNICAL FIELD

The present invention relates to a rubber composition comprising a rubber which is partially reacted with hydrogen (hereinafter "a reaction with hydrogen" is referred to "hydrogenation") and which has extremely excellent resilience and low exothermic property, excellent wet skid resistance, and further improved processability.

More specifically, the present invention relates to a rubber composition comprising a raw material rubber which contains a partially hydrogenated rubber of a conjugated diene rubber, a silica, an organo-silane coupling agent, and a vulcanizing agent, and if necessary, a carbon black. Especially when the composition of the present invention is employed to prepare a tire, it exhibits the effect of saving of fuel cost.

BACKGROUND ART

Recently, with the progress of the automobile industry, more advances than before in various sorts of functions such as safety, handling stability, economical efficiency, comfort for the occupant in an automobile, no environmental pollution, etc. are demanded of tires with which the automobile is equipped. Especially with the increased number of automobiles, consumption of petroleum type fuel is increased, and accordingly atmospheric pollution such as carbon dioxide, nitrogen oxide, etc. contained in exhaust gas causes environmental pollution which is a social problem. Therefore, a reduction in petroleum-type fuel consumption by an improvement in fuel efficiency of an automobile and the conversion to use of electric cars which do not produce exhaust gas are demanded. Thus, a rubber material which has low rolling resistance and therefore reduces fuel consumption has been demanded of automobile tires.

The rolling resistance of a tire is mainly influenced by the hysteresis loss of a tread on rolling of the tire, and the rolling resistance is improved by using a composition exhibiting a low hysteresis loss. Further, as a function of a tire, safety such as handling stability, braking performance (a property of wet skid resistance) on a wet road surface and durability such as wear resistance are important. However, although both the rolling property and the wet skid resistance of a tire are functions which relate to the hysteresis loss of a tread rubber, these functions are in contradiction to each other, and therefore it has been heretofore thought to be difficult to simultaneously improve both of them.

As the vibratory frequency corresponding to rolling of a tire is different from that corresponding to the wet skid thereof, by noting the fact, many trials to improve the balance between these two types of functions have been heretofore proposed.

Many of these improvement relate to a method for improving the balance between the rolling property and the wet skid resistance of a tire by optimizing a raw material rubber used to formulate a rubber for vulcanization for a tire-tread including a carbon black as the reinforcing agent.

Recently, a rubber composition has been proposed wherein a polymer in which the double bonds of the butadiene portion of a styrene-butadiene rubber (hereinafter abbreviated as "SBR") are partially hydrogenated is employed [U.S. Pat. No. 5,017,660 (the counterpart thereof, Japanese Patent Publication Examined No. 5('93)-74353)]. However, this technique relates to a composition in which a conventional carbon black is formulated as a reinforcing agent thereof, and shows insufficient effect, especially in resilience and a low exothermic property.

On the other hand, apart from these techniques, a method has been proposed wherein a silica is employed instead of a conventional carbon black as a reinforcing agent which is used in the formulating materials for a tire-tread, and thus the rolling property thereof is improved.

However, in contrast to a carbon black, a silica has a low affinity with a raw material rubber and thus has an extremely low dispersibility in a rubber. Therefore, in order that the performance as the rubber composition can be exhibited, it is important to disperse the silica well in the rubber. For that purpose, employing a silane type coupling agent, modifying a rubber, and enhancing the affinity of the silica for the rubber composition are generally carried out. From the aspect of physical properties, as compared with the case of using a carbon black, the formulated materials of a silica generally has a low exothermic property, and a good rolling property in relation thereto, and shows the same level of hardness and tensile strength after vulcanization, but shows low modulus of large deformation, inferior wear resistance, large degree of shrinkage of the formulated materials, and inferior processability, which have been problems.

In order to solve the problems as seen in these formulated materials which contain a silica, an optimization of a raw material rubber, a method wherein interaction between a silica and a rubber is strengthened by employing a specified silica coupling agent, and the like have been proposed.

As the method for modifying a rubber and thus improving the performance thereof, Japanese Patent Publication Unexamined No. 62('87)-50346 has proposed a rubber composition formulating a silica and a (co)polymer which is obtained by reacting an alkoxy-silane type compound with the activated terminal end of a diene polymer obtained by (co)polymerizing a (co)polymer with an organo-lithium as the initiator. Japanese Patent Publication Unexamined No. 62('87)-227908 has proposed a method for producing polymers obtained by reacting a halogenated silane compound with the activated terminal end of a living polymer obtained by polymerizing a polymer with an organic alkali metal. It is shown therein that these polymers show good tensile strength and wear resistance.

As a method for improving performances by employing a raw material rubber having a specified structure, Japanese Patent Publication Unexamined No. 3('91)-239737 discloses a pneumatic tire using in the tire-tread thereof a rubber composition formulating a silica in SBR having a specified distribution of styrene chains.

As a method of using a rubber having a specified structure and using a specified silane coupling agent, U.S. Pat. No. 5,409,969 (the counterpart thereof, Japanese Patent Publication Unexamined No. 3('91)-252431) has proposed a pneumatic tire using a rubber composition for a tread which composition formulates a silica and a silane coupling agent having a specified structure in a polymer having a glass transition temperature not lower than −50° C. U.S. Pat. No. 5,409,969 (the counterpart thereof, Japanese Patent Publication Unexamined No. 3('91)-252433) discloses a pneumatic tire using the rubber composition for a tread which composition formulates a silica and a silane compound having a specified structure as an organo-silane coupling agent in a polymer obtained by reacting a halogenated silane compound having the specified structure with an activated terminal of the above-described polymer.

Further, U.S. Pat. No. 5,227,425 has proposed a tire prepared from a rubber composition obtained by mixing under specified conditions a solution-polymerized SBR having a specified polymer structure, a silica having specified properties, and a silane coupling agent.

Each of these techniques has the effect of improving wet skid resistance, a rolling property, i.e., a property of saving fuel cost, and wear resistance, but has not sufficiently satisfied the high performance properties required of a tire such as a low exothermic property and processability.

DISCLOSURE OF THE INVENTION

As stated above, for an automobile tire used from now firstly including an electric car, a rubber composition for a tire use having resilience, that is, a rolling property, resulting in high fuel cost savings, and being far excellent in a low exothermic property, wet skid resistance, and processability has been required, but a rubber composition satisfying these requirements has not yet been available. The present inventors have intensively studied to accomplish this task described above. As a result, they have found that by employing a rubber composition comprising a raw material rubber which contains a rubber having a specified polymer structure, a silica, an organo-silane coupling agent, and a vulcanizing agent, and if necessary, a carbon black, an improved automobile tire can be prepared. Thus, the present invention has been accomplished.

That is, the present invention provides a rubber composition comprising:

(A) 100 parts by weight of a raw material rubber which contains not less than 30% by weight of at least one partially hydrogenated rubber of a conjugated diene rubber, wherein 5 to 70% of the unsaturated double bonds of the conjugated diene portion thereof have been hydrogenated;

(B) 10 to 150 parts by weight of a silica;

(C) 0.1 to 20 parts by weight of an organo-silane coupling agent; and (D) 0.1 to 10 parts by weight of a vulcanizing agent.

BEST MODE FOR CARRYING OUT THE INVENTION

The partially hydrogenated product (hereinafter referred to as "a partially hydrogenated rubber") of a conjugated diene rubber of component (A) of the rubber composition according to the present invention is a vulcanizable rubbery polymer obtained by partially hydrogenating a rubber containing a conjugated diene. The conjugated diene rubber which is a precursor of the partially hydrogenated rubber is exemplified by a butadiene rubber, a styrene-butadiene rubber, an isoprene rubber, a butadiene-isoprene rubber, a styrene-isoprene rubber, a styrene-butadiene-isoprene rubber, etc. They are used singly or in a mixture. A preferable conjugated diene rubber is a butadiene rubber, and a styrene-butadiene rubber.

When the partially hydrogenated rubber of a styrene-butadiene rubber or a butadiene rubber is used as the partially hydrogenated rubber, the composition of butadiene is preferably in the range of 50 to 100% by weight, more preferably 60 to 100% by weight, especially preferably 65 to 100% by weight based on the total weight of the partially hydrogenated rubber. If the composition of butadiene is less than 50% by weight, when the partially hydrogenated rubber is used in the composition of the present invention, rubber elasticity thereof is lost, hardness thereof is raised, and resilience, wear resistance and a low exothermic property thereof are decreased, which are unfavorable. In a styrene-butadiene rubber, styrene may be polymerized in the copolymer chain in any chaining style such as random, block, partially block, or the like. However, from the point of resilience and a low exothermic property of the composition, a random chaining (distribution) thereof is preferable.

Generally, a cis-1,4 linkage (a cis linkage), a trans-1,4 linkage (a trans linkage), a 1,2-linkage and a 3,4-linkage (a vinyl linkage) reside as a mode of linking of the conjugated butadiene portion. A content of a vinyl linkage is defined by the ratio of the amount of a vinyl linkage based upon the sum of the amounts of a cis linkage, a trans linkage and a vinyl linkage. The content of a vinyl linkage of the conjugated diene portion in a conjugated diene rubber before hydrogenation is preferably 10 to 80%. When the content of a vinyl linkage is higher than 80%, wear resistance of the rubber composition of the present invention is markedly decreased. When the content is lower than 10%, the content of hydrogenated vinyl becomes low, and resilience, i.e., a rolling property, a low exothermic property, wet skid resistance (a grip property) and processability, which are the characteristics of the present invention, can not be sufficiently exhibited. The content of a vinyl linkage is more preferably in the range of 20 to 70%, most preferably 30 to 60%. The vinyl linkage of the conjugated diene portion may reside uniformly in a molecular chain, or may be increased or decreased along the molecular chain.

As for the partially hydrogenated rubber of a conjugated diene rubber of component (A) of the present invention, 5 to 70% of the unsaturated double bond of the conjugated diene portion must be hydrogenated. If the hydrogenation ratio is lower than 5%, resilience and a low exothermic property cannot be exhibited when it is used as the composition. If the ratio is higher than 70%, the reactivity thereof with a coupling agent or with a coupling agent and a carbon black is reduced, and strength of the composition is unfavorably decreased. The hydrogenation ratio is preferably in the range of 5 to 50%, more preferably 5 to 40%. When the hydrogenation ratio is in the range of 5 to 50%, the partially hydrogenated rubber exhibits the effects of decreasing Mooney viscosity, and therefore improving processability as compared with the case of using a rubber before hydrogenation.

As for the method and condition of hydrogenation for obtaining a partially hydrogenated rubber, the method of hydrogenation under mild conditions at a pressure of about 30 kg/cm$^2$G or lower and at a temperature of about 120° C. or lower is preferable by employing an organo-metallic compound of titanium by itself or a homogeneous catalyst consisting of the organo-metallic compound of titanium and an organo-metallic compound of lithium, magnesium, or aluminium [U.S. Pat. No. 4,501,857 (the counterpart thereof, Japanese Patent Publication Examined No. 63('88) -4841), U.S. Pat. No. 4,673,714 (the counterpart thereof, Japanese Patent Publication Examined No. 1('89)-37970), and Japanese Patent Publication Unexamined No. 4('92)- 96904]. By employing the catalytic system, hydrogenation with a small amount of catalyst is possible, and the hydrogenated rubber can be used without removing the catalyst residue after the reaction.

Further, when the partially hydrogenated rubber of component (A) of the present invention generally has a branched molecular chain structure by employing a stannous compound as a polyfunctional linking agent, it is possible with the catalyst to conduct a hydrogenation reaction while completely retaining a tin-carbon linkage formed before the hydrogenation. In other words, it is possible to conduct the hydrogenation without causing a decomposition reaction of a branched polymer which is likely to happen when using another kind of catalytic system. This is confirmed by the fact that GPC curves of the polymer before and after hydrogenation do not show any change except that of a molecular weight due to a hydrogenation reaction.

As the rubber before hydrogenation, that having a branching or radial structure may be used by branching a polymer chain of a rubber having an activated terminal with a polyfunctional linking agent such as silicon tetrachloride, tin tetrachloride, a polyepoxy compound or the like, or by adding a branching agent such as divinylbenzene, etc. to a polymer system. These products are favorable from the point of processability. Especially, the branched product with tin tetrachloride is favorable from the points of resilience, a low exothermic property, and a property of wet skid resistance.

The compound containing a functional group (hereinafter referred to as a "modifier") which reacts with an activated terminal of a rubber before hydrogenation may be made to react with the terminal of a polymer thereof. Further, it can be used together with a polyfunctional linking agent or a branching agent. The modifier is exemplified by a tin monochloride compound, an imide compound, a carbodiimide compound, a lactam compound, an imidazolidinone compound, an isocyanate compound, a thioisocyanate compound, a phosphate compound, an organo-silane compound, an organo-silane halide compound, etc., and preferably by a tin monochloride compound, a carbodiimide compound and a lactam compound such as triphenyltin monochloride, trimethyltin monochloride, tributyltin monochloride, dicyclohexylcarbodiimide, diphenylcarbodiimide, diphenylcyanamide, N-methylpyrrolidone, etc.

The partially hydrogenated rubber of component (A) of the present invention preferably has a weight-average molecular weight (Mw) in the range of 10,000 to 1,000,000, and a molecular weight distribution (Mw/Mn) in the range of 1 to 10, more preferably Mw in the range of 50,000 to 500,000 and Mw/Mn in the range of 1 to 5. The Mooney viscosity $ML_{1+4}$ (100° C.) thereof is preferably in the range of 20 to 200, more preferably 30 to 150, most preferably 50 to 140. When the molecular weight, the molecular weight distribution or the viscosity falls outside the ranges specified above, resilience, a low exothermic property, wear resistance or processability of the rubber composition is markedly decreased, and practical use thereof is difficult.

The partially hydrogenated rubber of component (A) of the present invention is required to have a glass transition temperature (Tg) in the range of −100° to 0° C. The Tg should be preferably in the range of −100° to −20° C., more preferably −95° to −30° C. When Tg is higher than 0° C., the composition of the present invention has insufficiently low exothermic property and wear resistance which are unfavorable. When Tg is lower than −100° C., the partially hydrogenated rubber has markedly inferior wet skid resistance, and is not suitable for the rubber composition of the present invention. In case of a tire in which much importance to a property of wet skid resistance (a grip property) is given, a partially hydrogenated rubber having high Tg is preferably used, whereas in case of a tire in which much importance to the effect of saving fuel cost is given, a partially hydrogenated product having low Tg is preferably used. In case of employing both of the partially hydrogenated rubbers, or the partially hydrogenated rubber and other sorts of rubbers as a blend, a combined use of a rubber having high Tg and that having low Tg is preferable.

The most favorable method for obtaining the partially hydrogenated rubber of component (A) of the present invention is a method wherein a rubber before hydrogenation is solution-polymerized with an organo-lithium catalyst, and in the obtained polymer solution, as it is, the succeeding hydrogenation reaction is carried out, which is industrially extremely useful. The partially hydrogenated rubber is obtained by removing a solvent from the solution obtained as described above and isolating the rubber.

The raw material rubber of component (A) of the present invention consists of a partially hydrogenated rubber itself or a blend thereof with a natural rubber, a butadiene rubber, an isoprene rubber, a styrene-butadiene rubber, a styrene-isoprene rubber, or an ethylene-propylene rubber. The blending ratio of the partially hydrogenated rubber is in the range of 30 to 100% by weight based upon the total weight of a raw material rubber. Usually commercialized articles may be used for the butadiene rubber and the styrene-butadiene rubber.

As the silica of component (B) of the present invention, any of anhydrous silica, hydrous silica and a synthetic silicate type silica may be used. The amount of silica must be in the range of 10 to 150 parts by weight based upon 100 parts by weight of the raw material rubber, preferably in the range of 15 to 120 parts by weight. When the amount is less than 10 parts by weight, the effect of reinforcing with a silica cannot be exhibited, and strength and wear resistance of the rubber composition are inferior, whereas when the amount is more than 150 parts by weight, processability and elongation thereof are markedly decreased, and it is not usable. The favorable silica from the point of physical properties is that which is a small particle. Further, a silica of a small particle and a highly coherent type (having a large surface area and a highly oil-absorptive property) is especially favorable since it is good in dispersibility in a rubber and from the points of physical properties and processability.

The organo-silane coupling agent of component (C) of the present invention means an organo-silane compound which can couple a silica and the partially hydrogenated rubber. Specifically, it is exemplified by a trialkoxy silane compound or a dialkoxy silane compound, respectively, containing a functional group. Preferably, the organo-silane coupling agent may be represented by the general formulae as shown below.

$(RO)_3SiC_nH_{2n}S_mC_nH_{2n}Si(OR)_3$, $(RO)_3SiC_nH_{2n}X$, or $(RO)_3SiC_nH_{2n}S_mY$, wherein R represents an alkyl group having 1 to 4 carbon atoms, the three Rs may be identical or different; n represents an integer of 1 to 6; m represents an integer of 1 to 6; X represents a mercapto group, an amino group, a vinyl group, a nitroso group, an imido group, a chlorine atom, or an epoxy group; and Y represents a cyano group, an N,N-dimethylthiocarbamoyl group, a mercaptobenzothiazole group, or a methacrylate group. Among these, an organo-silane coupling agent containing a sulfur atom is more preferable from the viewpoint of reactivity with the partially hydrogenated rubber. More specifically, bis(3-triethoxysilylpropyl)tetrasulfide, γ-mercaptopropylmethoxysilane, 3-thiocyanatepropyltriethoxysilane, and trimethoxysilylpropylmercaptobenzothiazoletetrasulfide are most preferable.

The amount of the organo-silane coupling agent must be in the range of 0.1 to 20 parts by weight based upon 100 parts by weight of a raw material rubber. When the amount is less than 0.1 part by weight, it becomes difficult to make a silica sufficiently dispersed in a rubber, and a rubber composition having favorable rubber elasticity cannot be obtained. When the amount is more than 20 parts by weight, the vulcanizing density thereof increases more than necessary, and increase of hardness and decrease of elongation thereof are remarkable, which is unfavorable.

The vulcanizing agent of component (D) of the present invention means sulfur and a sulfur compound. The sulfur compound includes sulfur monochloride, sulfur dichloride, a disulfide compound, a polymer polysulfide, etc. A preferable vulcanizing agent is sulfur. The amount of the vulcanizing agent required must be in the range of 0.1 to 10 parts by weight based upon 100 parts by weight of a raw material rubber. When the amount is less than 0.1 part by weight or is more than 10 parts by weight, appropriate rubber elasticity of the composition cannot be exhibited, which is unfavorable. A vulcanization accelerator, an activator, and a cross-linking agent may be used together therewith. The vulcanization accelerator includes compounds of a guanidine type, an aldehyde-amine type, an aldehyde-ammonia type, a thiazole type, a sulfenic amide type, a thiourea type, a thiuram type, a dithiocarbamate type, a xanthate type, etc. The activator includes zinc white, stearic acid, etc. The cross-linking agent includes an oxime compound, a nitroso compound, a polyamine compound, etc. besides a radical initiator such as an organic peroxide compound, an azo compound, etc.

The carbon black of component (E) of the present invention means a furnace black, a thermal black, and a channel black which are usually used for reinforcing a rubber. The amount of a carbon black is in the range of 10 to 150 parts by weight, preferably in the range of 10 to 100 parts by weight, more preferably in the range of 15 to 80 parts by weight, based on 100 parts by weight of a raw material rubber. When the amount is more than 150 parts by weight, hardness becomes high, and elongation is decreased, and thus appropriate rubber elasticity is lost, and when the amount is less than 10 parts by weight, it is not favorable from the viewpoints of weather resistance, strength, and electric conductivity.

The carbon black which is preferable from the point of physical properties is a carbon black which has a specific surface area by nitrogen adsorption of 40 to 150 m$^2$/g and a DBP (dibutyl phthalate) absorption number (according to ASTM-D-2414) of 70 to 180 ml/100 g. When the specific surface area by nitrogen adsorption is less than 40 m$^2$/g, wear resistance of the composition is decreased. When it is more than 150 m$^2$/g, the composition shows a dramatic increase of hardness and a dramatic decrease of resilience, elongation and processability, and is not usable for a rubber composition.

As exemplary grades, various types of furnace blacks such as SAF (Super abrasion furnace), ISAF (Intermediate super abrasion furnace), HAF (High abrasion furnace), and FEF (Far extruding furnace) may be used. What is favorable from the point of physical properties is a carbon black which is made of small particles. Further, a carbon black made of small particles and a high coherent type (having a high specific surface area and a high oil-absorption property) has a good dispersibility in a rubber, and is especially favorable from the aspects of physical properties and processability. Moreover, a carbon black to which surface treatment is conducted and in which an OH (hydroxyl) group is introduced is favorable since it has reactivity with an organo-silane coupling agent.

Further, if necessary, a softening agent, a reinforcing agent, a bonding accelerator, a filler, an antioxidant, an age resistor, an ultraviolet light absorber, a lubricant, a foaming agent, a foaming promoter, a flame retardant, an antistatic agent, a coloring agent, a coloring protector, a plasticizer, a processing aid, a scorch retarder, other formulating ingredient, etc. may be added.

A process oil may be used as an example of the softening agent. The amount thereof used is in the range of 5 to 40 parts by weight based upon 100 parts by weight of a raw material rubber. When the amount is more than 40 parts by weight, resilience and a low exothermic property of the composition which are the characteristics of the present invention cannot be exhibited, which is unfavorable. When the amount is less than 5 parts by weight, processability is decreased, and kneading of the rubber with a carbon black, and the like become extremely difficult, and therefore it becomes hard to obtain a uniform composition. The process oil includes a paraffinic process oil, a naphthenic process oil, and an aromatic process oil.

The reinforcing agent includes an inorganic reinforcing agent such as an activated calcium carbonate, etc., and an organic reinforcing agent such as a high styrenic resin and a phenolformaldehyde resin, etc. The reinforcing agent may be used in the range of not more than 80 parts by weight based upon 100 parts by weight of a raw material rubber. The bonding accelerator may be used in combination with these reinforcing agents. The filler is exemplified by calcium carbonate, clay, talc, aluminum hydroxide, a zeolite, a diatomaceous earth, aluminum sulfate, barium sulfate, etc.

The antioxidant or the age resistor includes amine derivatives such as diphenyl amine type, p-phenylenediamine type, etc., quinoline derivatives, hydroquinone derivatives, monophenols, diphenols, thiobisphenols, hindered phenols, esters of a phosphorous acid, etc. One type of these may be used in the range of 0.001 to 10 parts by weight based upon 100 parts by weight of the raw material rubber, and at least two types of them may be used in combination.

Besides these, concerning the ultraviolet absorber, the lubricant, the foaming agent, the foaming promoter, the flame retardant, the anitstatic agent, the coloring agent, the coloring protector, the plasticizer, the processing aid, the scorch retarder, the other formulating ingredients of a rubber, etc., those that are already known in the art may be used according to the known purposes of using them.

The composition containing the partially hydrogenated rubber of the present invention is mixed as one of raw material rubbers with various sorts of formulating agents by using at least one of various types of mixing devices which are generally used for mixing of a rubber composition, such as open rolls, a Banbury mixer, a kneader, an extruder, etc., and is subsequently molded into a desired shape, followed by vulcanization. The mixing may be conducted by using any method. For instance, a method wherein a raw material rubber and various types of formulating agents are mixed all at once, and a method wherein they are mixed in several stages are possible. In the case of mixing in several stages, a method wherein (A) a raw material rubber, (B) a silica, and (C) an organo-silane coupling agent, and if necessary, (E) a carbon black are firstly mixed, and subsequently (D) a vulcanizing agent, and other additives are mixed, and a method wherein (B) a silica and (C) an organo-silane coupling agent are firstly mixed and made to react, and subsequently they are mixed with (A) a raw material rubber, and if necessary, (E) a carbon black, and lastly (D) a vulcanizing agent is added thereto, are possible.

EXAMPLES

The present invention is explained by the following Examples, but is not to be construed as limited by the Examples.

Bound styrene content, bound butadiene content, bound isoprene content, microstructure of the butadiene portion, microstructure of the isoprene portion, glass transition temperature, molecular weight distribution (Mw/Mn), amount of branching polymer, Mooney viscosity, and hydrogenation ratio of a rubber were measured by the methods as shown below.

(1) Bound styrene content

A rubber before hydrogenation was made to a chloroform solution, and the bound styrene content (wt. %) was measured by the absorption of light of UV 254 nm by a phenyl group of styrene.

(2) Bound butadiene content

When the rubber before hydrogenation was a styrene-butadiene rubber, bound butadiene content was calculated from the equation "100-styrene content (wt. %)". When the rubber is a butadiene-isoprene rubber or a styrene-isoprene-butadiene rubber, by using pyrolysis gas chromatography, the bound butadiene content (wt. %) was measured by the amount of 4-vinyl cyclohexene on the chromatogram.

(3) Bound isoprene content

By using pyrolysis gas chromatography, the bound isoprene content (wt. %) was measured by the amount of dipentene on the chromatogram.

(4) Microstructure of the butadiene portion

A rubber before hydrogenation was made to a carbon disulfide solution, and an infrared spectrophotometric absorption spectrum thereof was measured by using an infrared spectrophotometer (A202 manufactured by JASCO Corporation). Each of bound contents of 1,2-vinyl, 1,4-cis and 1,4-trans were calculated by a Morero method in the case of a rubber not containing styrene, and by a Hampton method in the case of a rubber containing styrene, respectively.

(5) Microstructure of the isoprene portion

A butadiene-isoprene rubber or a styrene-butadiene-isoprene rubber is made to a deutero-chloroform solution, and a $^{13}$C-NMR spectrum was measured by using FT-NMR (67.5 MHz; manufactured by JEOL Ltd.). Each of bound contents of 1,2-linkage, 3,4-linkage and 1,4-linkage was calculated from the relative intensities of carbon signals in the respective methyl groups.

(6) Glass transition temperature (Tg)

This was measured while raising the temperature at a rate of 10° C./min. using DSC (DSC-20 type manufactured by Seiko Instruments Inc.). The inflection point of the DSC curve thereof was regarded as the glass transition temperature.

(7) Molecular weight distribution (Mw/Mn) and Amount of branching polymer

A rubber was made to a tetrahydrofuran (hereinafter abbreviated as "THF") solution, and a chromatogram was measured by using GPC (pump: LC-5A manufactured by SHIMADZU CORPORATION; column: polystyrene gel, each of HSG-40, 50, and 60 (manufactured by TOSOH CORPORATION); detector: a differential refractomer). A weight average molecular weight (Mw) and a number average molecular weight (Mn) in terms of a molecular weight of polystyrene were calculated by a usual method of using the calibration curve determined from the relation between the molecular weights of the peaks of standard polystyrenes and the retention volume, and the distribution was calculated.

The amount (%) of branching polymers was calculated as the ratio of an area of the peaks of the branching polymers to the area of all of the peaks on the chromatogram.

(8) Mooney viscosity

This was measured at 100° C. by using an L-rotor of a Mooney viscometer.

(9) Hydrogenation ratio

A rubber before hydrogenation and a partially hydrogenated rubber were made to a deutero-chloroform solution, and respective $^1$H-NMR spectrums were measured by using FT-NMR (270 MHz; manufactured by JEOL Ltd.). The hydrogenation ratio was calculated from the relative intensities of proton signals due to the unsaturated double bonds in the range of chemical shift of 4.7 to 5.8 ppm before and after hydrogenation.

REFERENTIAL EXAMPLE 1

[Preparation of Rubber before hydrogenation (A)]

Into an autoclave of 10 liter inner volume equipped with a stirrer and a jacket as the reactor, 4,200 g of n-hexane, 720 g of 1,3-butadiene and 80 g of styrene were introduced. Then, 8.9 ml of a n-hexane solution of n-butyllithium (concentration: 5% by weight) and a 35 molar amount of THF based on the amount of lithium was added thereto, and polymerization was carried out at 60° C. Just after the termination of the polymerization, a 0.138 molar amount of tin tetrachloride based on the amount of lithium was added thereto, and the reaction was conducted for 5 minutes. Deactivation thereof was carried out by adding therein to a 0.5 molar amount of methanol based on the amount of lithium. The resultant product was named as the rubber before hydrogenation (A), and the analytical values are shown in Table 1.

REFERENTIAL EXAMPLE 2

[Preparation of Rubbers before Hydrogenation (B to J)]

Various types of rubbers before hydrogenation (B to J) were prepared by changing an amount of monomers of styrene and butadiene, an amount of THF, an amount of n-butyllithium, and a type and an amount of a polyfunctional linking agent with or without a 0.4 molar amount of a modifier based on the amount of lithium. The analytical values of the rubbers before hydrogenation (B to J) are shown in Table 1.

REFERENTIAL EXAMPLE 3

[Preparation of Partially Hydrogenated Rubbers (AH1 to AH4)]

A solution prepared by mixing 250 ml of a cyclohexane solution of di-p-tolyl-bis(1-cyclopentadienyl)titanium (concentration: 1 mmol/l) and 50 ml of a n-butyllithium solution (concentration: 5 mmol/l) as a hydrogenation catalyst under a hydrogen pressure of 2.0 kg/cm$^2$ at 0° C. was added to the polymer solution after polymerization of the rubber before hydrogenation (A). A reaction was carried out under a hydrogen partial pressure of 2.5 kg/cm² for 30 minutes while supplying 3.7 mol of hydrogen. 0.5 part by weight of 2,6-di-tert-butylhydroxytoluene as an antioxidant per 100 parts by weight of the resultant partially hydrogenated rubber was added, and solvent was removed. Hydrogenated rubbers AH1 to AH4 having a different hydrogenation ratio were obtained by changing an amount of hydrogen absorbed. The analytical values of these rubbers are shown in Table 2.

REFERENTIAL EXAMPLE 4

[Preparation of Partially Hydrogenated Rubbers (BH1 to JH1)]

Using the rubbers before hydrogenation B to J, a hydrogenation reaction was carried out under the same conditions as in Referential Example 3 except that the hydrogenation ratio was changed, and partially hydrogenated rubbers BH1 to JH1 were obtained. The analytical values of these rubbers are shown in Table 2.

REFERENTIAL EXAMPLE 5

[Preparation of Rubbers before Hydrogenation (K and L) and Partially Hydrogenated Rubbers (KH1 and LH1)]

Into an autoclave of 10 liter inner volume equipped with a stirrer and a jacket as the reactor, 4,200 g of n-hexane, 480 g of 1,3-butadiene and 320 g of isoprene were introduced. Then, 8.9 ml of a n-hexane solution of n-butyllithium (concentration: 5% by weight) and a 50 molar amount of THF based on the amount of lithium was added thereto, and polymerization was carried out at 60° C. Just after the termination of polymerization, a 0.108 molar amount of tin tetrachloride based on the amount of lithium was added thereto, and a reaction was conducted for 5 minutes. Deactivation thereof was carried out by adding therein to a 0.5

TABLE 1

| Rubber before hydrogen-ation | Bound styrene content (wt. %) | Bound butadiene content (wt. %) | Microstructure of butadiene portion | | | Glass transition temp. Tg (°C.) | Molecular weight distribution Mw/Mn | Branching structure | | | Modifier |
| | | | 1,2-linkage content (%) | Cis-1,4 linkage content (%) | Trans-1,4 linkage content (%) | | | Polyfunctional linking agent | Branching polymer content (%) | Mooney viscosity (ML$_{1+4}$, 100° C.) | |
| --- | --- | --- | --- | --- | --- | --- | --- | --- | --- | --- | --- |
| A | 25 | 75 | 37 | 27 | 36 | −47 | 1.6 | SnCl$_4$ | 55 | 70 | — |
| B | 20 | 80 | 40 | 26 | 34 | −51 | 1.7 | SnCl$_4$ | 57 | 70 | TPSC *¹ |
| C | 20 | 80 | 40 | 25 | 35 | −50 | 1.8 | SnCl$_4$ | 55 | 72 | DCC *² |
| D | 20 | 80 | 39 | 26 | 35 | −50 | 1.7 | SnCl$_4$ | 54 | 74 | NMP *³ |
| E | 10 | 90 | 30 | 30 | 40 | −73 | 1.5 | SnCl$_4$ | 53 | 68 | — |
| F | 39 | 61 | 27 | 31 | 42 | −35 | 1.6 | SnCl$_4$ | 41 | 62 | — |
| G | 20 | 80 | 58 | 18 | 24 | −43 | 1.6 | SnCl$_4$ | 74 | 80 | — |
| H | 7 | 93 | 77 | 10 | 13 | −32 | 1.7 | SnCl$_4$ | 44 | 65 | — |
| I | 0 | 100 | 55 | 19 | 26 | −61 | 1.7 | SnCl$_4$ | 60 | 70 | — |
| J | 0 | 100 | 13 | 35 | 52 | −95 | 2.1 | — | — | 45 | — |

Note:
*¹TPSC: Triphenyl stannic chloride
*² DCC: Dicyclohexyl carbodiimide
*³ NMP: N-methylpyrrolidone

TABLE 2

| Partially hydrogenated rubber | Rubber before hydrogenation | Hydrogenation ratio (%) | Mooney viscosity (ML$_{1+4}$, 100° C.) | Glass transition temp. Tg (°C.) |
| --- | --- | --- | --- | --- |
| AH1 | A | 3 | 69 | −48 |
| AH2 | | 20 | 62 | −50 |
| AH3 | | 45 | 58 | −53 |
| AH4 | | 80 | 62 | −55 |
| BH1 | B | 40 | 58 | −57 |
| CH1 | C | 38 | 62 | −56 |
| DH1 | D | 39 | 64 | −56 |
| EH1 | E | 30 | 63 | −75 |
| FH1 | F | 25 | 58 | −38 |
| GH1 | G | 40 | 64 | −48 |
| GH2 | | 65 | 62 | −51 |
| HH1 | H | 55 | 56 | −40 |
| IH1 | I | 30 | 58 | −66 |
| JH1 | J | 18 | 48 | −96 | molar amount of methanol based on the amount of lithium. The resultant product was named as the rubber before hydrogenation (K). Further, a rubber before hydrogenation (L) was obtained by conducting a polymerization under the same conditions as above except that styrene, butadiene and isoprene were used as a monomer. These rubbers before hydrogenation were hydrogenated under the same conditions as AH1 to obtain partially hydrogenated rubbers (KH1 and LH1). The analytical values of these rubbers before hydrogenation and partially hydrogenated rubbers are shown in Table 3.

TABLE 3

| | Rubber before hydrogenation | | | | | | | | |
|---|---|---|---|---|---|---|---|---|---|
| | | | | Microstructure of butadiene portion | | | Microstructure of isoprene portion | | |
| | | | | | | Trans- | | | |
| Rubber | Bound styrene content (wt. %) | Bound butadiene content (wt. %) | Bound isoprene content (wt. %) | 1,2-linkage content (%) | Cis-1,4 linkage content (%) | 1,4 linkage content (%) | 1,2-linkage content (%) | 3,4-linkage content (%) | 1,4-linkage content (%) |
| K | 0 | 60 | 40 | 46 | 23 | 31 | 6 | 36 | 58 |
| KH1 | 0 | 60 | 40 | 46 | 23 | 31 | 6 | 36 | 58 |
| L | 15 | 50 | 35 | 41 | 26 | 33 | 4 | 31 | 65 |
| LH1 | 15 | 50 | 35 | 41 | 26 | 33 | 4 | 31 | 65 |

| | Rubber before hydrogenation | | | | | Paritally hydrogenated rubber | | |
|---|---|---|---|---|---|---|---|---|
| | | | Branching structure | | | | | |
| Rubber | Glass transition temp. Tg (°C.) | Molecular weight distribution Mw/Mn | Polyfunctional linking agent | Branching polymer content (%) | Mooney viscosity ($ML_{1+4}$, 100° C.) | Hydrogenation ratio (%) | Mooney viscosity ($ML_{1+4}$, 100° C.) | Glass transition temp. Tg (°C.) |
| K | −60 | 1.7 | $SnCl_4$ | 43 | 48 | — | — | — |
| KH1 | −60 | 1.7 | $SnCl_4$ | 43 | 48 | 25 | 45 | −63 |
| L | −62 | 1.7 | $SnCl_4$ | 45 | 53 | — | — | — |
| LH1 | −62 | 1.7 | $SnCl_4$ | 45 | 53 | 30 | 49 | −66 |

REFERENTIAL EXAMPLE 6

[Preparation of Rubbers before Hydrogenation (M, N and O) and Partially hydrogenated rubbers (MH1, NH1 and OH1)]

An autoclave of 10 liter inner volume which has an inlet at the bottom and an outlet at the top and is equipped with a stirrer and a jacket was used as the reactor, and two of the autoclaves were linked in series. From the inlet of the bottom of the first reactor, 14.7 g/min of 1,3-butadiene, 5.3 g/min of styrene, 120 g/min of cyclohexane, 0.025 g/min of tetramethylethylenediamine (hereinafter abbreviated as "TMEDA") and 0.0100 g/min of n-butyllithium as a polymerization initiator were continuously fed at the respective rates using a constant feeding pump, and the inner temperature of the reactor was kept at 97° C. The resultant polymer solution was continuously taken out from the top of the reactor and fed to the second reactor. The temperature of the second reactor was kept at 95° C. As a polyfunctional linking agent, 0.3 mol of tetraglycidyl-1,3-bisaminomethyl cyclohexane per 1 mol of the activated polymer was continuously fed to react. After an antioxidant was continuously added to the above polymer, solvent was removed to obtain a rubber before hydrogenation (M). Further, the polymer solution after the polyfunctional linking agent was added was introduced into another reactor of 10 liter inner volume. Then, a hydrogenation reaction was conducted under the same conditions as in Referential Example 3 to obtain a partially hydrogenated rubber (MH1).

The same procedure as above was carried out except that silicon tetrachloride was used as a polyfunctional linking agent and the amounts of styrene and TMEDA were changed to obtain a rubber before hydrogenation (N) and a partially hydrogenated rubber (NH1).

Further, a rubber before hydrogenation (O) was obtained under the same conditions as above except that a polyfunctional linking agent was not used, and the amounts of styrene and of the polymerization initiator were changed. The hydrogenation reaction was carried out under the same conditions as in Referential Example 3 except that a catalytic solution comprising 200 ml of a toluene solution of nickel naphthenate (concentration: 5 mmol/l) and 50 ml of n-butyllithium (concentration: 5 mmol/l) was used as a hydrogenation catalyst to obtain a partially hydrogenated rubber (OH1). The analytical values of these rubbers before hydrogenation and partially hydrogenated rubbers are shown in Table 4.

As rubbers other than the rubbers before hydrogenation and the hydrogenated rubbers which were obtained in the above-described Referential Examples 1 to 6, commercial rubbers listed in Table 5 were used for an emulsion-polymerized styrene-butadiene rubber (hereinafter abbreviated as "SBR"), a natural rubber and a butadiene rubber (hereinafter abbreviated as "BR").

TABLE 4

| | Rubber before hydrogenation | | | | | | | | | | Paritally hydrogenated rubber | | |
|---|---|---|---|---|---|---|---|---|---|---|---|---|---|
| | | Bound buta- | Microstructure of butadiene portion | | | Glass tran- si- tion | Mole- cular | Branching structure | | | | Glass tran- si- tion | Oil- *2 extended- ed |
| | Bound styrene content | diene content | 1,2- linkage content | Cis-1,4 linkage content | Trans- 1,4 linkage content | temp. Tg | weight distri- bution | Poly- func- tional linking | Branch- ing polymer content | Mooney viscosity (ML$_{1+4}$, | Hydro- gena- tion | Mooney viscosity (ML$_{1+4}$, | temp. Tg | Mooney viscosity (ML$_{1+4}$, |
| Rubber | (wt. %) | (wt. %) | (%) | (%) | (%) | (°C.) | Mw/Mn | agent | (%) | 100° C.) | ratio | 100° C.) | (°C.) | 100° C.) |
| M | 18 | 82 | 35 | 28 | 37 | −53 | 2.6 | TGAMH *1 | 35 | 130 | — | — | — | 55 |
| MH1 | 18 | 82 | 35 | 28 | 37 | −53 | 2.6 | TGAMH *1 | 35 | 130 | 35 | 115 | −57 | 52 |
| N | 20 | 80 | 50 | 22 | 28 | −40 | 2.4 | SiCl$_4$ | 25 | 133 | — | — | — | 55 |
| NH1 | 20 | 80 | 50 | 22 | 28 | −40 | 2.4 | SiCl$_4$ | 25 | 133 | 45 | 118 | −45 | 51 |
| O | 35 | 65 | 33 | 28 | 39 | −33 | 2.5 | None | 0 | 115 | — | — | — | 50 |
| OH1 | 35 | 65 | 33 | 28 | 39 | −33 | 2.5 | None | 0 | 115 | 30 | 103 | −37 | 46 |

Note:
*1 TGAMH: Tetraglycidyl-1,3-bisaminomethylcyclohexane
*2 Mooney viscosity of an oil-extended rubber which is prepared by adding 37.5 parts by weight of an aromatic oil per 100 parts by weight of a rubber

TABLE 5

| | | | | Microstructure of butadiene portion | | | Glass tran- sition temp. Tg (°C.) | Mooney viscosity (ML$_{1+4}$, 100° C.) | Oil-extended rubber | |
|---|---|---|---|---|---|---|---|---|---|---|
| Rubber | Commercial rubber | Bound styrene content (wt. %) | Bound butadiene content (wt. %) | 1,2- linkage content (%) | Cis-1,4 linkage content (%) | Trans-1,4 linkage content (%) | | | Glass tran- sition temp. Tg (°C.) | Mooney *3 viscosity (ML$_{1+4}$, 100° C.) |
| SBR1 | SBR1502 *1 | 23.5 | 76.5 | 17 | 13 | 70 | −58 | 52 | — | — |
| SBR2 | SBR 1712 *1 | 23.5 | 76.5 | 17 | 13 | 70 | — | — | −55 | 52 |
| NR1 | Natural rubber RSS #3 | — | — | — | — | — | −68 | 70 | — | — |
| BR1 | BR01 *2 | 0 | 100 | 2 | 96 | 2 | −108 | 42 | — | — |

Note:
*1 Emulsion-polymerized SBR manufactured by Nippon Zeon Co., Ltd.
*2 High cis-BR manufactured by Japan Synthetic Rubber Co., Ltd.
*3 Mooney viscosity of an oil-extended rubber which is prepared by adding 37.5 parts by weight of an aromatic oil per 100 parts by weight of a rubber A formulation, a kneading method, molding by vulcanization and measurement of physical properties of a rubber are as follows:

(1) Formulation

Various types of formulations used in Examples and Comparative Examples are collectively shown in Table 6.

(2) Kneading method

By using a Bambury mixer (inner volume: 1.7 liters, predetermined temperature: 80° C.), a raw material rubber was kneaded for 6 minutes with a silica, an organo-silane coupling agent, an aromatic oil, zinc white, and stearic acid, and if necessary, a carbon black. After the formulated ingredients were cooled to room temperature, they were again kneaded for 5 minutes. After cooling, by using open rolls (10 inches, 80° C.), sulfur, a vulcanizing accelerator and an age resistor were kneaded with the above-described formulated ingredients, and the rubber composition was obtained.

(3) Molding by vulcanization

The composition was put into a mold, and molding by vulcanization was carried out for 20 minutes by heating under a pressure using a press at 160° C.

(4) Measurement of physical properties

Physical properties of the vulcanized product were measured as follows:

1) Hardness: Measured using Type A hardness tester with a spring according to the hardness testing method of JIS-K-6301.
2) Tensile strength: Measured according to the tensile testing method of JIS-K-6301.
3) Resilience: Measured by a Rüpke method according to JIS-K-6301 wherein a sample was preheated in an oven at 70° C. for one hour and quickly removed from it for the measurement.

The resilience indicates a rolling property and is an index showing a energy saving property; the larger the value is, the more excellent the energy saving property is.

4) Exothermic property [Goodrich heat build-up]: Using a Goodrich flexometer, the test was conducted under the conditions of a load of 24 pounds, a displacement of 0.225 inch, a starting temperature of 50° C. and a rotational number of 1800 rpm. This was represented by the elevated temperature difference after 20 minutes. The smaller the number is, the lower the exothermic property is, which is favorable.

5) Wet skid resistance: Measured according to the method of ASTM-E-303-83 by using a British Pendulum Skid Resistance Tester, and a Type B Safety-Walk (manufactured by 3M UK HOLDINGS PLC.) as the road surface. The value is represented by an index which makes 100 the value obtained on using the emulsion-polymerized SBR 1502 (Comparative Example 4). The larger the index is, the more favorable it is.

6) Wear-resistant property: Measured by using a Pico-abrasion testing machine according to ASTM-D-2228-83. The result is represented by an index which makes 100 the value obtained on using the emulsion-polymerized SBR 1502 (Comparative Example 4). The larger the index is, the more favorable the wear-resistant property is.

silica and 10 parts by weight of a carbon black) as shown in Table 6, and the kneading and the molding by vulcanization thereof as stated above were conducted. The various sorts of physical properties of the resultant vulcanized products were measured. The results are shown in Table 7.

The results show the effect of the hydrogenation degree influencing to various sorts of physical properties, and that the vulcanized product has favorable physical properties in the appropriate range of the hydrogenation degree.

COMPARATIVE EXAMPLE 5 TO 7

Rubber compositions were obtained by using the rubber before hydrogenation A, the partially hydrogenated rubber AH2, and an emulsion-polymerized SBR as rubbers and

TABLE 6

(All numbers in the table are expressed by part by weight)

| Formulation | | SR1 | SR2 | SR3 | SR4 | RR1 | RR2 |
|---|---|---|---|---|---|---|---|
| Rubber | | 100 | 100 | 100 | 100 | 100 | 100 |
| Aromatic oil | *1 | 5 | 5 | 37.5 | 5 | 5 | 37.5 |
| Silica | *2 | 35 | 20 | 60 | 45 | 0 | 0 |
| Silane coupling agent | *3 | 4 | 2 | 5 | 5 | 0 | 0 |
| Sulfur | | 1.7 | 1.7 | 1.5 | 1.7 | 1.7 | 1.5 |
| Vulcanizing accelerator CZ | *4 | 1.0 | 1.0 | 1.5 | 1.0 | 1.0 | 1.5 |
| Vulcanizing accelerator Z | *5 | 1.5 | 1.5 | 1.5 | 1.5 | 1.5 | 1.5 |
| Carbon black N339 | *6 | 6 | 23 | 10 | 0 | 45 | 75 |
| Carbon black N330 | *7 | 4 | 2 | 5 | — | — | — |
| Total amount of carbon black | | 10 | 25 | 15 | 0 | 45 | 75 |
| Zinc white | | 3 | 3 | 3 | 3 | 3 | 3 |
| Stearic acid | | 2 | 2 | 2 | 2 | 2 | 2 |
| Antioxidant 3C | *8 | 1 | 1 | 1 | 1 | 1 | 1 |
| Wax | | 1 | 1 | 1 | 1 | 1 | 1 |

Note:
*1 Trade name: Sonic X-140 (manufactured by Japan Energy Co., Ltd.)
*2 Trade name: Nipsil AQ (manufactured by Nippon Silica Industry Co., Ltd.)
*3 Si69 (Trade name, manufactured by Degussa AG) contained in a silane coupling agent-containing masterbatch X50S (Trade name, manufactured by Degussa AG); Compound name: bis(3-triethoxysilylpropyl)tetrasulfide
*4 Compound name: N-cyclohexyl-2-benzothiazolylsulfenamide
*5 Compound name: Diphenylguanidine
*6 Trade name: Seast KH (manufactured by Tokai Carbon Co., Ltd.)
*7 Carbon black contained in a silane coupling agent-containing masterbatch X50S (Trade name, manufactured by Degussa AG)
*8 Compound name: N-isopropyl-N'-phenyl-p-phenylenediamine

EXAMPLES 1 AND 2 AND COMPARATIVE EXAMPLES 1 to 4

A rubber before hydrogenation (A), a partially hydrogenated rubber (AH1 to AH4) and SBR1 were formulated according to the formulation SR1 (35 parts by weight of a carbon black) as shown in Table 6. The physical properties of the resultant vulcanized products are shown in Table 7. Resultantly, the composition not containing a silica does not show favorable physical properties such as resilience and a low exothermic property.

TABLE 7

| Ex. or Comp. Ex. | Rubber | Hydrogenation ratio (%) | Formulation | Mooney viscosity of formulations (ML$_{1+4}$, 100° C.) | Physical properties of vulcanized product | | | | |
|---|---|---|---|---|---|---|---|---|---|
| | | | | | Hardness (JIS-A) | Tensile strength (MPa) | Resilience at 70° C. (%) | Exothermic property ΔT (°C.) | Wet skid resistance (index) | Wear resistance (index) |
| Comp. Ex. 1 | A | 0 | SR1 | 71 | 64 | 20.7 | 74 | 21 | 105 | 94 |
| Comp. Ex. 2 | AH1 | 3 | | 70 | 64 | 20.5 | 74 | 20 | 105 | 95 |
| Ex. 1 | AH2 | 20 | | 65 | 63 | 21.2 | 77 | 17 | 106 | 94 |
| Ex. 2 | AH3 | 45 | | 61 | 63 | 21.3 | 77 | 16 | 105 | 96 |
| Comp. Ex. 3 | AH4 | 80 | | 68 | 65 | 19.7 | 73 | 18 | 104 | 92 |
| Comp. Ex. 4 | SBR1 | 0 | | 85 | 66 | 28.0 | 66 | 28 | 100 | 100 |
| Comp. Ex. 5 | A | 0 | RR1 | 75 | 64 | 24.2 | 69 | 32 | 105 | 92 |

TABLE 7-continued

| Ex. or Comp. Ex. | Rubber | Hydrogenation ratio (%) | Formulation | Mooney viscosity of formulations ($ML_{1+4}$, 100° C.) | Physical properties of vulcanized product | | | | |
|---|---|---|---|---|---|---|---|---|---|
| | | | | | Hardness (JIS-A) | Tensile strength (MPa) | Resilience at 70° C. (%) | Exothermic property $\Delta T$ (°C.) | Wet skid resistance (index) | Wear resistance (index) |
| Comp. Ex. 6 | AH2 | 20 | | 67 | 64 | 22.8 | 71 | 28 | 105 | 88 |
| Comp. Ex. 7 | SBR1 | 0 | | 65 | 67 | 28.3 | 61 | 35 | 100 | 98 |

EXAMPLES 3 TO 11

Rubber compositions were obtained using the partially hydrogenated rubbers BH1, CH1, DH1, EH1, FH1, GH1, HH1 and IH1 as a rubber and according to the formulation SR1 as shown in Table 6. The physical properties of the resultant vulcanized products are shown in Table 8.

COMPARATIVE EXAMPLES 8 TO 13

Rubber compositions were obtained using the partially hydrogenated rubbers BH1, EH1, FH1, GH1, HH1 and IH1 as a rubber according to the formulation RR1 shown in Table 6. The physical properties of the resultant vulcanized products are shown in Table 8.

It is proved from Table 8 that the formulation SR1 (35 parts by weight of a silica and 10 parts by weight of a carbon black) exhibits extremely excellent resilience at 70° C. and low exothermic property as compared with the formulation RR1 (45 parts by weight of carbon black) in the comparison between Examples 3 to 11 and Comparative Examples 8 to 13, respectively, using various types of the partially hydrogenated rubber.

EXAMPLES 12 AND 13

Rubber compositions of Examples 12 and 13 were obtained using the partially hydrogenated rubber AH2 as a rubber according to the formulation SR2 (25 parts by weight of a carbon black and 20 parts by weight of a silica) and the formulation SR4 (45 parts by weight of a silica), respectively. The physical properties of the resultant vulcanized products are shown in Table 9 together with the results of Example 1 [the formulation SR1 (10 parts by weight of a silica and 35 parts by weight of a carbon black)] and Comparative Example 6 [the formulation RR1 (45 parts by weight of a carbon black)]. As a result, it was proved that the composition formulating a silica and a carbon black, or a silica has suitable resilience at 70° C. and low exothermic property. Particularly, the composition formulating a silica and a carbon black is proved to have extremely excellent resilience, low exothermic property and wet skid resistance.

TABLE 8

| Ex. or Comp. Ex. | Rubber | Hydrogenation ratio (%) | Formulation | Physical properties of vulcanized product | | | | | |
|---|---|---|---|---|---|---|---|---|---|
| | | | | Hardness (JIS-A) | Tensile strength (MPa) | Resilience at 70° C. (%) | Exothermic property $\Delta T$ (°C.) | Wet skid resistance (index) | Wear resistance (index) |
| Ex. 3 | BH1 | 40 | SRI | 64 | 20.4 | 78 | 17 | 102 | 100 |
| Ex. 4 | CH1 | 40 | | 64 | 21.5 | 78 | 18 | 102 | 99 |
| Ex. 5 | DH1 | 40 | | 64 | 19.8 | 78 | 19 | 102 | 98 |
| Ex. 6 | EH1 | 30 | | 63 | 15.8 | 75 | 19 | 88 | 118 |
| Ex. 7 | FH1 | 25 | | 67 | 23.6 | 75 | 18 | 114 | 92 |
| Ex. 8 | GH1 | 40 | | 65 | 18.4 | 76 | 18 | 107 | 90 |
| Ex. 9 | GH2 | 65 | | 66 | 18.7 | 76 | 17 | 106 | 92 |
| Ex. 10 | HH1 | 55 | | 66 | 14.8 | 74 | 19 | 115 | 78 |
| Ex. 11 | IH1 | 35 | | 65 | 12.9 | 76 | 20 | 94 | 114 |
| cf. Ex. 1 | AH2 | 20 | | 63 | 21.2 | 77 | 17 | 106 | 94 |
| Comp. Ex. 8 | BH1 | 40 | RR1 | 64 | 24.2 | 75 | 26 | 103 | 92 |
| Comp. Ex. 9 | EH1 | 30 | | 63 | 22.4 | 71 | 27 | 87 | 106 |
| Comp. Ex. 10 | FH1 | 25 | | 67 | 25.8 | 67 | 29 | 114 | 88 |
| Comp. Ex. 11 | GH1 | 40 | | 65 | 22.3 | 69 | 26 | 106 | 84 |
| Comp. Ex. 12 | HH1 | 55 | | 66 | 18.7 | 68 | 27 | 114 | 72 |
| Comp. Ex. 13 | IH1 | 35 | | 64 | 17.7 | 72 | 26 | 93 | 112 |

TABLE 9

| | | | Composition of formulation | | | | Physical properties of vulcanized product | | | | | |
|---|---|---|---|---|---|---|---|---|---|---|---|---|
| | | Rubber | Formu-lation | Aromatic oil (wt. part) | Silica (wt. part) | Carbon black (wt. part) | Mooney vis-cosity | Hard-ness (JIS-A) | Tensile strength (MPa) | Resilience at 70° C. | Exothermic property ΔT (°C.) | Wet skid resist-ance (index) | Wear resist-ance (index) |
| | Ex. 12 | AH2 | SR2 | 5 | 20 | 25 | 66 | 62 | 22.0 | 75 | 20 | 106 | 94 |
| cf. | Ex. 1 | | SR1 | 5 | 35 | 10 | 65 | 63 | 21.2 | 77 | 17 | 106 | 94 |
| | Ex. 13 | | SR4 | 5 | 45 | 0 | 90 | 65 | 19.2 | 74 | 18 | 104 | 85 |
| cf. | Comp. Ex. 6 | | RR1 | 5 | 0 | 45 | 67 | 64 | 22.8 | 71 | 28 | 105 | 88 |

EXAMPLE 14 AND COMPARATIVE EXAMPLES 14 AND 15

Rubber compositions of Example 14 and Comparative Examples 14 and 15 were obtained by using the formulation SR1 or the formulation RR1 in the blending system of 60 parts of a partially hydrogenated rubber or a rubber before hydrogenation and 40 parts by weight of a natural rubber. The compositions, formulations and properties of the resultant vulcanized products are shown in Table 10. When a partially hydrogenated rubber is used for the blend with a natural rubber, it is shown that the resultant vulcanized product has excellent resilience at 70° C., low exothermic property, wet skid resistance, and wear resistance as compared with the case of using a rubber before hydrogenation. However, it is also proved that the effect of improving resilience and a low exothermic property is not exhibited by merely formulating a carbon black.

EXAMPLES 16 AND 17 AND COMPARATIVE EXAMPLES 18 AND 19

Rubber compositions were obtained by using the formulation SR1 in the blending system wherein the composition of the partially hydrogenated rubber AH2 and a natural rubber were changed. The compositions, formulations and properties of the resultant vulcanized products are shown in Table 11.

EXAMPLES 18 AND 19 AND COMPARATIVE EXAMPLE 20

Rubber compositions were obtained by using the formulation SR1 in the blending system of 60 parts by weight of a partially hydrogenated rubber or an emulsion-polymerized SBR and 40 parts by weight of an emulsion-polymerized

TABLE 10

| | Rubber material | | | | | Physical properties of vulcanized product | | | | | |
|---|---|---|---|---|---|---|---|---|---|---|---|
| | Component 1 | | Component 2 | | | | Tensile | | Exothermic | Wet skid | Wear |
| | Rubber | Part by weight | Rubber | Part by weight | Formu-lation | Hardness (JIS-A) | strength (MPa) | Resilience at 70° C. | property ΔT (°C.) | resistance (index) | resistance (index) |
| Ex. 14 | JH1 | 60 | OR1 | 40 | SR1 | 64 | 22.5 | 77 | 18 | 82 | 136 |
| Comp. Ex. 14 | J | 60 | OR1 | 40 | | 64 | 21.0 | 74 | 22 | 80 | 126 |
| Comp. Ex. 15 | JH1 | 60 | OR1 | 40 | RR1 | 64 | 22.9 | 72 | 23 | 80 | 130 |

EXAMPLE 15 AND COMPARATIVE EXAMPLES 16 AND 17

Rubber compositions were obtained by using the formulation SR1 or the formulation RR1 in the blending system of 60 parts by weight of a partially hydrogenated rubber or a rubber before hydrogenation and 40 parts by weight of a natural rubber. The compositions, formulations and properties of the resultant vulcanized products are shown in Table 11.

SBR or a butadiene rubber. The compositions, formulations and properties of the resultant vulcanized products are shown in Table 11.

It is proved from Table 11 that by using a partially hydrogenated rubber in the blend with a partially hydrogenated rubber, and SBR or BR, the effect of improving resilience at 70° C. and a low exothermic property is exhibited.

TABLE 11

| | Rubber material | | | | | Physical properties of vulcanized product | | | | | |
|---|---|---|---|---|---|---|---|---|---|---|---|
| | Component 1 | | Component 2 | | | | Tensile | | Exothermic | Wet skid | Wear |
| | Rubber | Part by weight | Rubber | Part by weight | Formulation | Hardness (JIS-A) | strength (MPa) | Resilience at 70° C. | property ΔT (°C.) | resistance (index) | resistance (index) |
| Ex. 15 | AH2 | 60 | OR1 | 40 | SR1 | 63 | 25.3 | 76 | 17 | 99 | 92 |
| Comp. Ex. 16 | A | 60 | OR1 | 40 | | 63 | 23.8 | 73 | 20 | 97 | 90 |
| Comp. Ex. 17 | AH2 | 60 | OR1 | 40 | RR1 | 64 | 24.3 | 69 | 26 | 97 | 88 |
| Ex. 16 | AH2 | 80 | OR1 | 20 | SR1 | 63 | 23.2 | 77 | 17 | 102 | 94 |
| Ex. 17 | | 30 | | 70 | | 63 | 28.1 | 74 | 17 | 94 | 88 |
| Comp. Ex. 18 | | 20 | | 80 | | 63 | 28.5 | 72 | 18 | 90 | 84 |
| Comp. Ex. 19 | | 0 | | 100 | | 63 | 31.0 | 73 | 18 | 88 | 82 |
| Ex. 18 | AH2 | 60 | SBR1 | 40 | SR1 | 65 | 24.5 | 73 | 19 | 104 | 100 |
| Ex. 19 | FH1 | 60 | BR1 | 40 | | 63 | 18.8 | 77 | 18 | 88 | 114 |
| Comp. Ex. 20 | SBR1 | 60 | BR1 | 40 | | 65 | 18.5 | 70 | 27 | 83 | 112 |

EXAMPLES 20 AND 21 AND COMPARATIVE EXAMPLES 21 AND 22

Rubber compositions were obtained by using the formulation SR1 to the partially hydrogenated rubbers or the rubbers before hydrogenation in case of a butadiene-isoprene rubber or a styrene-butadiene-isoprene ternary rubber. The formulations and the physical properties of the resultant vulcanized products are shown in Table 12. It is proved that resilience at 70° C. and a low exothermic property are improved by using a partially hydrogenated rubber.

TABLE 12

| | | | | Physical properties of vulcanized product | | | | | |
|---|---|---|---|---|---|---|---|---|---|
| | Rubber | Hydrogenation ratio (%) | Formulation | Hardness (JIS-A) | Tensile strength (MPa) | Resilience at 70° C. | Exothermic property ΔT (°C.) | Wet skid resistance (index) | Wear resistance (index) |
| Comp. Ex. 21 | K | 0 | SR1 | 63 | 16.7 | 72 | 20 | 95 | 106 |
| Ex. 20 | KH1 | 25 | | 63 | 16.9 | 75 | 17 | 96 | 108 |
| Comp. Ex. 22 | L | 0 | SR1 | 64 | 19.3 | 71 | 20 | 96 | 108 |
| Ex. 21 | LH1 | 30 | | 64 | 19.2 | 74 | 16 | 97 | 110 |

EXAMPLES 22 TO 24 AND COMPARATIVE EXAMPLES 23 TO 31

Rubber compositions were obtained according to the formulation SR3 (60 parts by weight of a silica and 15 parts by weigh of a carbon black) or the formulation RR2 (75 parts by weight of a carbon black) respectively formulating 37.5 parts by weight of an aromatic oil per 100 parts by weight of a rubber using a partially hydrogenated rubber (MH1, NH1 or OH1), a rubber before hydrogenation (M, N or O) or an emulsion-polymerized SBR (SBR1 or SBR2). The formulations and the physical properties of the resultant vulcanized products are shown in Table 13.

As a result, it is proved that the resultant vulcanized products exhibit excellent resilience at 70° C., low exothermic property and wear resistance, while almost maintaining wet skid resistance, when any of the partially hydrogenated rubbers is employed in the formulation containing a silica and a carbon black (the formulation SR3), as compared with the case that a rubber before hydrogenation or an emulsion-polymerized SBR is employed.

However, it is also proved that the above-stated effect cannot always be exhibited if only a carbon black is employed with the above-described partially hydrogenated rubber (the formulation RR2).

TABLE 13

| | Rubber | Hydrogenation ratio (%) | Formulation | Hardness (JIS-A) | Tensile strength (MPa) | Resilience at 70° C. | Exothermic property ΔT (°C.) | Wet skid resistance (index) | Wear resistance (index) |
|---|---|---|---|---|---|---|---|---|---|
| | | | | | | | Physical properties of vulcanized product | | |
| Ex. 22 | MH1 | 35 | SR3 | 67 | 22.5 | 64 | 25 | 100 | 106 |
| Ex. 23 | NH1 | 45 | | 67 | 25.0 | 63 | 26 | 110 | 102 |
| Ex. 24 | OH1 | 30 | | 69 | 24.3 | 61 | 26 | 115 | 97 |
| Comp. Ex. 23 | M | 0 | | 67 | 22.0 | 62 | 32 | 100 | 103 |
| Comp. Ex. 24 | N | 0 | | 67 | 24.6 | 60 | 30 | 109 | 100 |
| Comp. Ex. 25 | O | 0 | | 69 | 23.5 | 57 | 31 | 115 | 92 |
| Comp. Ex. 26 | SBR2 | 0 | | 68 | 28.5 | 58 | 33 | 104 | 106 |
| Comp. Ex. 27 | SBR1 | 0 | | 68 | 26.5 | 54 | 36 | 104 | 102 |
| Comp. Ex. 28 | MH1 | 35 | RR2 | 68 | 20.4 | 59 | 32 | 100 | 97 |
| Comp. Ex. 29 | NH1 | 45 | | 70 | 20.4 | 57 | 32 | 108 | 84 |
| Comp. Ex. 30 | OH1 | 30 | | 71 | 22.5 | 55 | 32 | 112 | 78 |
| Comp. Ex. 31 | SBR2 | 0 | | 68 | 27.6 | 56 | 38 | 104 | 104 |

INDUSTRIAL APPLICABILITY

The rubber composition of the present invention has extremely excellent resilience, low exothermic property, and excellent wet skid resistance, and further improved processability, and therefore, by utilizing the characteristics, can be used for industrial parts such as tires for various types of automobiles, rubber vibration insulators, belts, and the like.

Especially when it is used for a tire, it can be suitably used for a tread portion, a cap tread portion, and an undertread portion of a tire, for instance, and exhibits the effect of saving fuel cost by improving fuel efficiency of a vehicle which utilizes the tire.

We claim:

1. A rubber composition comprising
   (A) 100 parts by weight of a raw material rubber which contains not less than 30% by weight of at least one partially hydrogenated rubber of a conjugated diene rubber having a class transition temperature in the range of –100° to 0° C., wherein 5 to 70% of the unsaturated double bonds of the conjugated diene portion thereof have been hydrogenated;
   (B) 10 to 150 parts by weight of a silica;
   (C) 0.1 to 20 parts by weight of an organo-silane coupling agent; and
   (D) 0.1 to 10 parts by weight of a vulcanizing agent.

2. The rubber composition according to claim 1, further comprising (E) 5 to 80 parts by weight of a carbon black.

3. The rubber composition according to claim 1, wherein the partially hydrogenated rubber is the hydrogenated product of at least one selected from the group consisting of a butadiene rubber, a styrene-butadiene rubber, an isoprene rubber, a butadiene-isoprene rubber, a styrene-isoprene rubber, and a styrene-butadiene-isoprene rubber.

4. The rubber composition according to claim 2, wherein the partially hydrogenated rubber is the hydrogenated product of at least one selected from the group consisting of a butadiene rubber, a styrene-butadiene rubber, an isoprene rubber, a butadiene-isoprene rubber, a styrene-isoprene rubber, and a styrene-butadiene-isoprene rubber.

5. The rubber composition according to claim 1, wherein the partially hydrogenated rubber is the hydrogenated product of a styrene-butadiene randomly copolymerized rubber having a butadiene content of not lower than 50% by weight and having a vinyl content of the butadiene portion thereof of not higher than 60% by weight.

6. The rubber composition according to claim 2, wherein the partially hydrogenated rubber is the hydrogenated product of a styrene-butadiene randomly copolymerized rubber having a butadiene content of not lower than 50% by weight and having a vinyl content of the butadiene portion thereof of not higher than 60% by weight.

7. The rubber composition according to claim 1, wherein the organo-silane coupling agent is at least one selected from the group consisting of bis(3-triethoxysilylpropyl) tetrasulfide, 3-thiocyanatepropyltriethoxysilane, and trimethoxysilylpropylmercaptobenzothiazoletetrasulfide.

8. The rubber composition according to claim 2, wherein the organo-silane coupling agent is at least one selected from the group consisting of bis(3-triethoxysilylpropyl) tetrasulfide, 3-thiocyanatepropyltriethoxysilane, and trimethoxysilylpropylmercaptobenzothiazoletetrasulfide.

9. A tire comprising the rubber composition according to claim 1.

10. A tire comprising the rubber composition according to claim 2.

11. A tire comprising the rubber composition according to claim 3.

12. A tire comprising the rubber composition according to claim 4.

13. A tire comprising the rubber composition according to claim 5.

14. A tire comprising the rubber composition according to claim 6.

15. A tire-tread comprising the rubber composition according to claim 1.

16. A tire-tread comprising the rubber composition according to claim 2.

17. A tire-tread comprising the rubber composition according to claim 3.

18. A tire-tread comprising the rubber composition according to claim 4.

19. A tire-tread comprising the rubber composition according to claim 5.

20. A tire-tread comprising the rubber composition according to claim 6.

21. A vulcanized product prepared from the rubber composition of claim 1.

22. The rubber composition according to claim 1, wherein said partially hydrogenated rubber of a conjugated diene rubber has a glass transition temperature in the range of −100° to −20° C.

23. The rubber composition according to claim 22, wherein said partially hydrogenated rubber of a conjugated diene rubber has a glass transition temperature in the range of −95° to −30° C.

24. A tire comprising the rubber composition according to claim 22.

25. A tire comprising the rubber composition according to claim 23.

* * * * *